United States Patent
Bemis et al.

(10) Patent No.: US 7,648,669 B2
(45) Date of Patent: Jan. 19, 2010

(54) INJECTION-MOLDING SYSTEM AND METHOD

(75) Inventors: Peter Bemis, Elkhart Lake, WI (US); Gary Vande Berg, Fox Lake, WI (US); Steven Kolste, Sheboygan Falls, WI (US)

(73) Assignee: Bemis Manufacturing Company, Sheboygan Falls, WI (US)

( * ) Notice: Subject to any disclaimer, the term of this patent is extended or adjusted under 35 U.S.C. 154(b) by 740 days.

(21) Appl. No.: 11/289,850

(22) Filed: Nov. 30, 2005

(65) Prior Publication Data

US 2006/0113710 A1 Jun. 1, 2006

Related U.S. Application Data

(60) Provisional application No. 60/632,478, filed on Nov. 30, 2004.

(51) Int. Cl.
B29C 45/13 (2006.01)

(52) U.S. Cl. .................... 264/328.8; 425/130

(58) Field of Classification Search ............. 264/328.1, 264/328.8; 425/130
See application file for complete search history.

(56) References Cited

U.S. PATENT DOCUMENTS

| | | | |
|---|---|---|---|
| 5,478,520 A | 12/1995 | Kasai et al. | |
| 5,545,027 A | 8/1996 | Kaneishi et al. | |
| 5,626,815 A | 5/1997 | Kaneishi et al. | |
| 5,639,417 A | 6/1997 | Kaneishi et al. | |
| 5,656,234 A | 8/1997 | Kaneishi et al. | |
| 5,833,899 A * | 11/1998 | Wunderlich | 264/40.4 |
| 5,891,381 A | 4/1999 | Bemis et al. | |
| 5,902,534 A | 5/1999 | Fujishiro et al. | |
| 5,942,169 A | 8/1999 | Narazaki et al. | |
| 6,030,203 A | 2/2000 | Kuroda | |
| 6,129,541 A | 10/2000 | Takeda | |
| 6,171,538 B1 * | 1/2001 | Beck et al. | 264/255 |
| 6,179,604 B1 | 1/2001 | Takeda | |
| 6,235,229 B1 * | 5/2001 | Beck et al. | 264/255 |
| 6,261,075 B1 * | 7/2001 | Lee et al. | 425/130 |
| 6,322,344 B1 | 11/2001 | Maruyama et al. | |
| 6,382,946 B1 * | 5/2002 | Beck et al. | 425/130 |
| 6,511,621 B2 | 1/2003 | Suzuki et al. | |
| 6,544,459 B2 | 4/2003 | Maruyama et al. | |
| 6,630,090 B1 * | 10/2003 | Nagaoka | 264/255 |
| 6,679,696 B1 * | 1/2004 | McConnell et al. | 425/112 |
| 6,793,481 B2 | 9/2004 | Murayama et al. | |
| 6,854,967 B2 | 2/2005 | Tsutsui et al. | |
| 6,866,811 B2 | 3/2005 | Kayano et al. | |
| 7,192,270 B2 * | 3/2007 | Babin | 425/572 |

* cited by examiner

*Primary Examiner*—Jill L Heitbrink
(74) *Attorney, Agent, or Firm*—Michael Best & Friedrich LLP

(57) ABSTRACT

A method of injection molding at least one part in a single mold having therein at least one cavity, the method comprising providing first and second injection molding devices, using the first injection molding device to inject material into the single mold, and thereafter using the second injection molding device to inject material into the single mold.

18 Claims, 5 Drawing Sheets

INJECTION-MOLDING SYSTEM AND METHOD

RELATED APPLICATION

This application claims priority of U.S. Application No. 60/632,478, filed Nov. 30, 2004 and titled "Injection-molding System and Method."

BACKGROUND

The present invention relates to an injection-molding system and method.

Injection-molding machines are commonly used to manufacture plastic components. Injection-molding machines are complex, expensive machines that melt the plastic and inject it into a mold. Each machine is generally sized to produce and deliver a shot of plastic no larger than a maximum size. For example, one machine may be sized to deliver no more than 100 ounces of plastic, while another machine may be capable of delivering 200 ounces. Thus, to produce a product that requires 150 ounces of plastic, a machine that has a capacity of at least 150 ounces would be required.

In addition, injection-molding machines are often arranged to produce one part from one material. To vary the material generally requires a reconfiguration of the machine resulting in undesirable downtime.

Also, a typical machine has a clamping device that holds the mold shut during the injection process. The amount of material that can be injected into the mold at any one time is limited by the capacity of the clamping device.

SUMMARY OF THE INVENTION

The present invention relates to a multi-barrel injection-molding system that provides for sequential injection-molding.

The invention provides a method of injection molding at least one part in a single mold having therein at least one cavity, the method comprising providing first and second injection molding devices, using the first injection molding device to inject material into the single mold, and thereafter using the second injection molding device to inject material into the single mold.

The invention also provides a method wherein the cavity has a cavity volume, the method further comprising providing the first and second injection molding devices each having an output volume less than the cavity volume, using the first injection molding device to inject material into the cavity to partially fill the cavity, and thereafter using the second injection molding device to inject additional material into the cavity.

The invention also provides a method wherein at least two parts are injection molded in the single mold, and wherein the mold has therein at least first and second cavities, the method further comprising using the first injection molding device to inject material into the first cavity, and thereafter using the second injection molding device to inject material into the second cavity.

The invention also provides an injection molding apparatus for use with either a co-injection nozzle having first and second nozzle inlets or a mold cavity having first and second mold cavity inlets, the apparatus comprising first and second injection molding devices having respective first and second device outlets, and a manifold communicating with the device outlets and having first and second manifold outlets for respective communication with either the first and second nozzle inlets or the first and second mold cavity inlets, the manifold being operable to selectively enable the first device outlet to communicate with either one of the manifold outlets, and to selectively enable the second device outlet to communicate with the other one of the manifold outlets.

The invention also provides an injection molding apparatus for use with a mold cavity having first and second mold cavity inlets, the apparatus comprising first and second injection molding devices having respective first and second device outlets, and a manifold communicating with the device outlets and having first and second manifold outlets for communication with the first and second mold cavity inlets, respectively, the manifold being operable to selectively enable the first device outlet to communicate with either one of the manifold outlets, and to selectively enable the second device outlet to communicate with the other one of the manifold outlets.

The invention also provides an injection molding apparatus for use with a mold cavity, the apparatus comprising first and second injection molding devices having respective first and second device outlets for respective first and second materials, a co-injection nozzle for communication with the mold cavity, the nozzle having a core material inlet and a skin material inlet, and a manifold communicating with the device outlets, and communicating with the co-injection nozzle, the manifold being operable to cause only first material to be injected into the cavity, to cause only second material to be injected into the cavity, to cause first material to enter the core material inlet and second material to enter the skin material inlet, or to cause second material to enter the core material inlet and first material to enter the skin material inlet.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
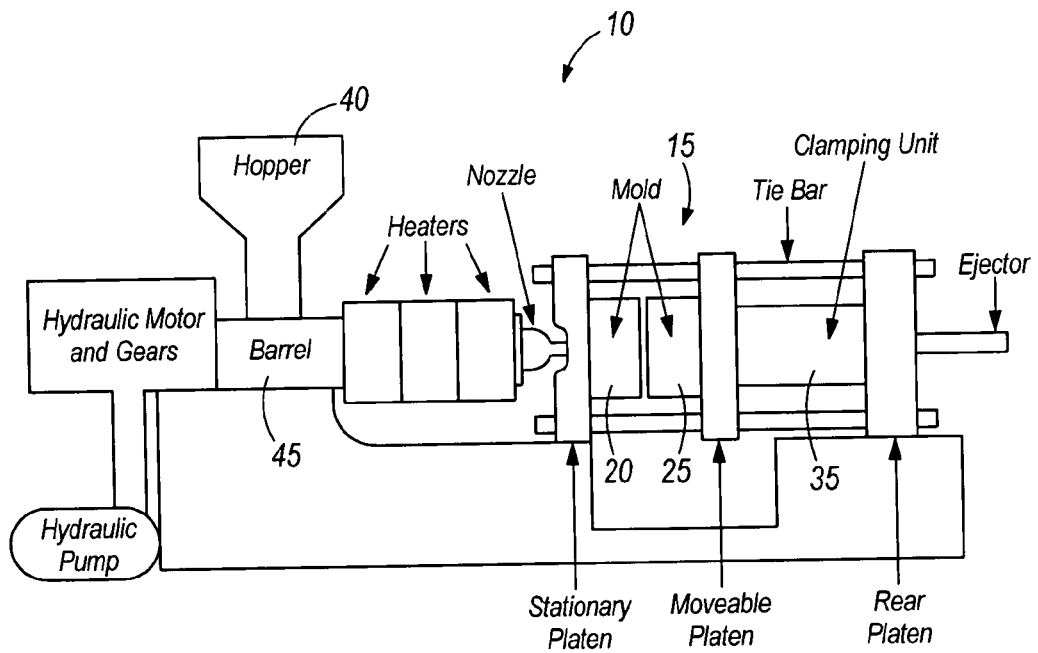
FIG. 1 is a schematic illustration of a prior art single-barrel injection molding machine.
Figure 2:
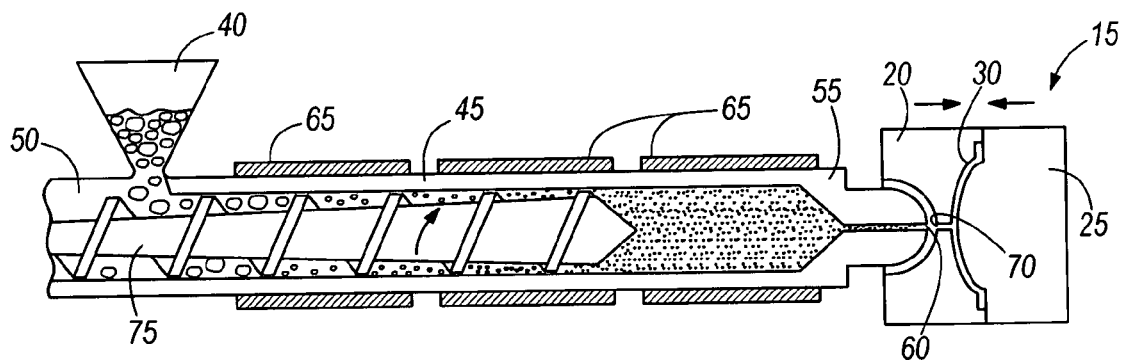
FIG. 2 is a schematic illustration of a barrel of FIG. 1.

FIGS. 1 and 2 are schematic illustrations of a single-barrel injection-molding machine 10. Injection molding machines inject a liquefied material (generally plastic) into a closed mold 15 to form a finished part. Generally the mold 15 includes two halves 20, 25 that together define one or more cavities 30. The cavities 30 define the part, or parts, to be manufactured. As the material is injected into the cavity 30 the high-pressure tends to open the mold 15. As such, a clamping unit 35 is used to hold the two halves 20, 25 together during the injection process. An injection-molding machine is described in detail in U.S. Pat. Nos. 5,650,178 and 5,891,381 both of which are fully incorporated herein by reference and are attached to this specification.

The machine 10 includes a hopper 40 disposed above a barrel 45. The hopper 40 contains solidified material (e.g., plastic resin) and delivers that material via gravity to the barrel 45. The barrel 45, illustrated schematically in FIG. 2, includes a first end 50 adjacent the hopper 40 and a second end 55 that defines a barrel outlet 60. One or more heaters 65 are disposed on the outer surface of the barrel 45 to provide heat. The barrel 45 is heated to melt the material within the barrel 45 prior to its injection into the mold 15. The temperature of the heaters 65 is controlled to not only melt the material within the barrel 45, but also maintain that material at a suitable temperature for injection. The actual temperature at which the barrel 45 is maintained may vary greatly depending on the material being used, the size and arrangement of the part being manufactured, and the distance between the barrel outlet 60 and a mold inlet 70. A transport device, in the form of a screw 75, moves the melted material from the first end 50 of the barrel 45 to the barrel outlet 60. Other constructions may employ a piston or other means as the transport device. In a single barrel injection-molding machine 10, the barrel outlet 60 generally includes a nozzle that directs the liquefied material into the mold 15.

Figure 3:
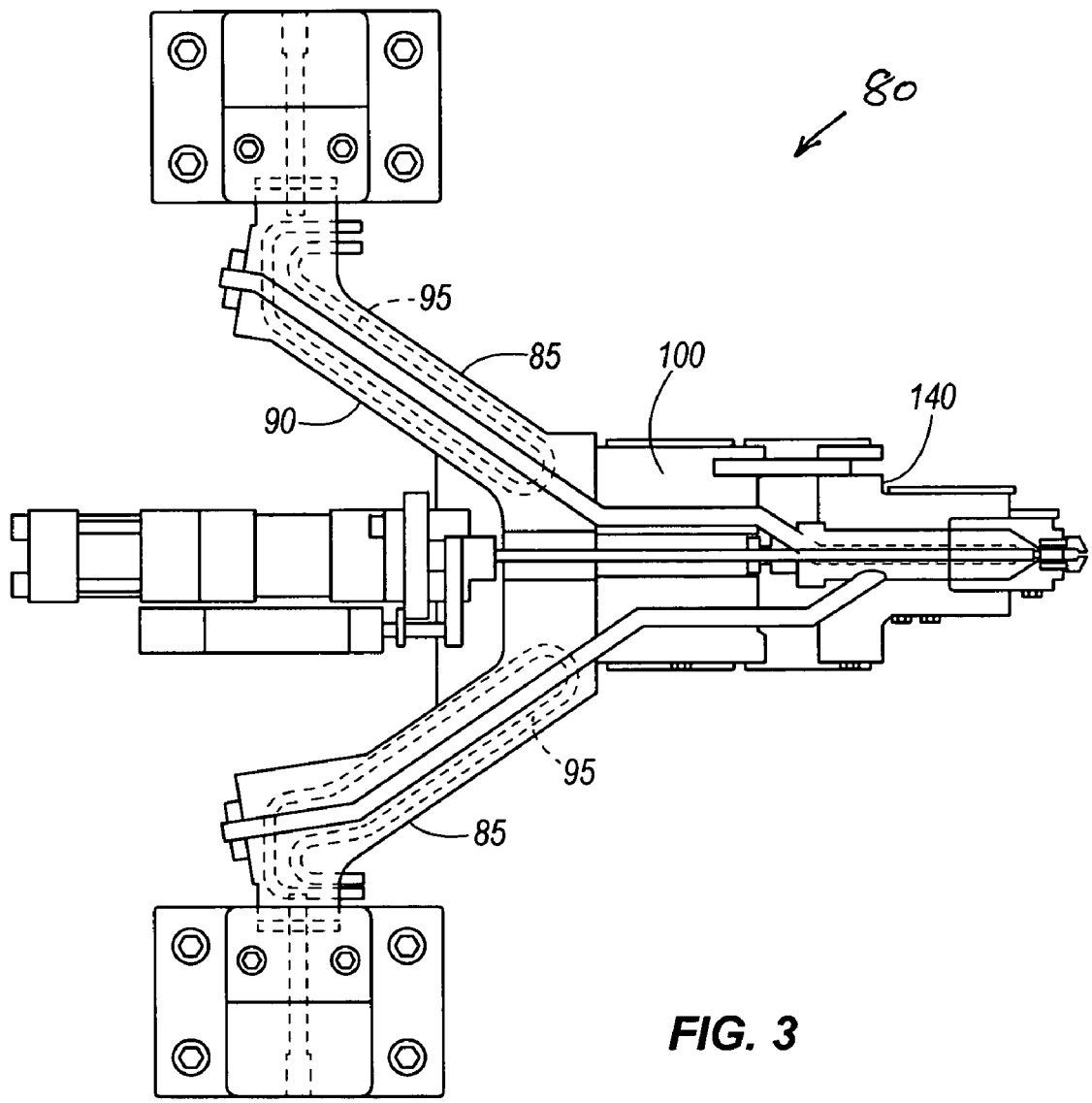
FIG. 3 is a top view, partially in section, of a portion of a two-barrel injection molding machine embodying the invention.

With reference to FIG. 3, a portion of a two-barrel injection-molding machine 80 embodying the invention is illustrated. In the two-barrel machine 80, each barrel 45 is fed by its own hopper 40 and the outlet 60 of each barrel 45 directs material into one leg 85 of a Y-block 90. The Y-block 90 includes a temperature control system that may include water passages 95 within each leg 85. The temperature control system allows for the precise control of the Y-block temperature. Thus, the material can be maintained in a liquid state within the Y-block 90. In constructions in which more than two barrels 45 are employed, additional legs 85 can be provided in the Y-block 90 or additional Y-blocks 90 can be positioned in series with the first Y-block 90. Thus, any number of barrels 45 could be employed using the system described herein.

Figure 4:
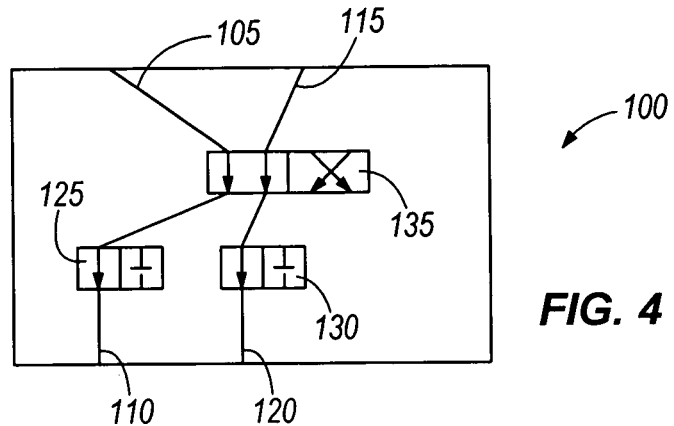
FIG. 4 is a schematic illustration of one possible manifold in a first configuration.

With continued reference to FIG. 3, each leg 85 of the Y-block 90 defines an outlet aperture that aligns with an inlet aperture in a manifold 100. The manifold 100 also includes an outlet aperture corresponding to each of the inlet apertures. Referring to FIG. 4, in which the manifold is shown schematically, passageways are defined within the manifold 100 to direct material from a first inlet 105 to a first outlet 110 and from a second inlet 115 to a second outlet 120. The manifold 100 may also contain flow valves 125, 130, shown schematically in FIGS. 4-7, which allow each of the flow paths to be selectively closed to inhibit flow. In addition, the manifold 100 may include a user selectable direction valve 135 that is movable between a first position and a second position. In the first position (FIG. 4), the first inlet 105 is in fluid communication with the first outlet 110 and the second inlet 115 is in fluid communication with the second outlet 120. In the second position (FIG. 5) the first inlet 105 is in fluid communication with the second outlet 120 and the second inlet 110 is in fluid communication with the first outlet 115. Other manifold constructions are also contemplated by the invention. For example, another construction may eliminate the direction valve 135 or position the direction valve 135 in a separate component.

Referring to FIG. 3, a co-injection molding housing 140, described in detail in U.S. Pat. Nos. 5,650,178 and 5,891,381 is positioned between the manifold 100 and the mold 15 and functions as is known in the art of injection molding. Specifically, the co-injection housing 140 allows a part to be manufactured using a first material to form the skin of the component and a second material to fill the space within the skin and define a core. Other constructions may position different housings between the manifold 100 and the mold 15 as may be required by the particular component being manufactured.

The manifold 100 allows the user to switch which barrel 45 provides material to the mold by simply repositioning the direction valve 135. In addition, the manifold 100 allows the operator to inhibit flow from one or both barrels 45 if desired. As one of ordinary skill will realize, there are many different arrangements of valves, manifolds, and flow paths that can produce this functionality.

Figure 5:
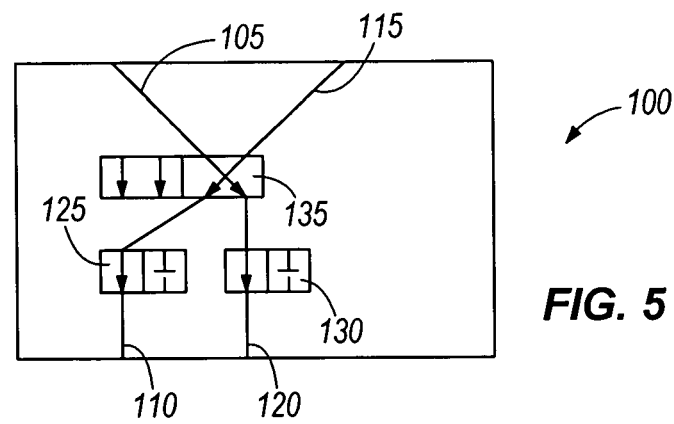
FIG. 5 is a schematic illustration of the manifold of FIG. 4 in a second configuration.
Figure 6:
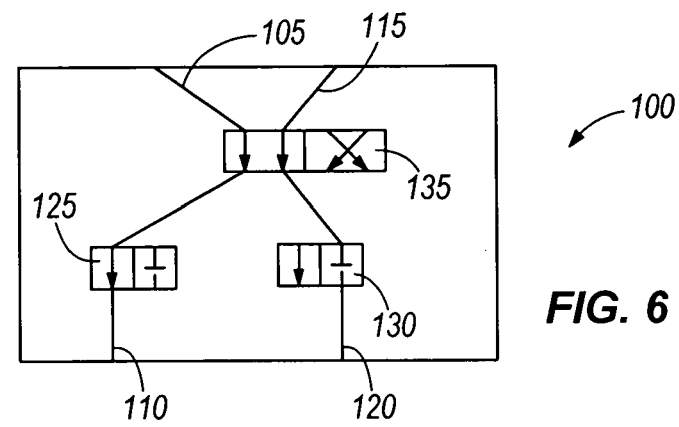
FIG. 6 is a schematic illustration of the manifold of FIG. 4 in a third configuration.
Figure 7:
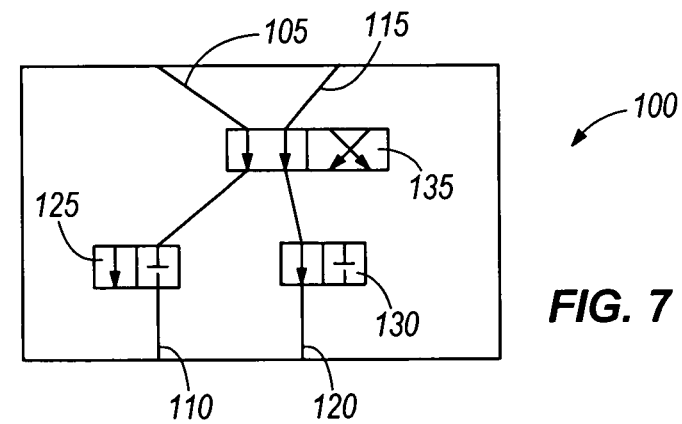
FIG. 7 is a schematic illustration of the manifold of FIG. 4 in a fourth configuration.

In one application, the manifold 100 allows the operator to switch materials for the core and skin of a part simply by moving the selectable direction valve 135 to the second position. Alternatively, one of the flow valves 125, 130 can be closed such that the entire part is made up of only one of the materials. Thus, with a single injection-molding machine 80, the same component can be manufactured with four different material properties without changing the set-up of the machine 80. To manufacture four components with different material properties the first hopper 40 is filled with a first material "A" and the second hopper 40 is filled with a second material "B". The first component includes material "A" as the skin and a core of material "B" and is made with the valves 125, 130, 135 arranged as shown in FIG. 4. The second component includes material "B" as the skin and a core of material "A" and is made by moving the direction valve 135 to the second position as shown in FIG. 5. The third component is made up entirely of material "A" with the valves 125, 130, 135 arranged as shown in FIG. 6 and the fourth component is made up entirely of material "B" with the valves 125, 130, 135 arranged as shown in FIG. 7.

In another application, the multi-barrel injection-molding machine 80 is used to form a component that requires a shot of material larger than what could normally be provided by the machine 80. To form the part, the first barrel 45 delivers a first shot to the mold 15. After the first shot is delivered, the second barrel 45 delivers a second shot. As the second shot is being delivered, the first barrel 45 is refilled. Thus, a third, shot could be delivered if necessary. Because only a single shot is delivered to the mold 15 at any one time, no increase in pressure is experienced by the mold 15. Thus, the clamping unit 35 of the mold 15 is sufficient to maintain the mold 15 in the clamped state. In one example, a 50-ounce two-barrel machine is used to form a 120-ounce part. The first barrel 45 provides a first shot of approximately 50 ounces and is immediately refilled. As the first shot is being injected into the mold 15, the flow valve 130 between the second barrel 45 and the mold 15 is closed to inhibit reverse flow into the barrel 45. As the injection of the first shot is completed, the flow valve 130 between the second barrel 45 and the mold 15 is opened and the flow valve 125 between the first barrel 45 and the mold 15 is closed. With the valves 125, 130 arranged in this manner, the shot within the second barrel 45 (again approximately 50 ounces) can be injected into the mold 15. As the second shot is injected, the first barrel 45 is refilled. Once the second shot is completely injected, the flow valves 125, 130 again reverse positions and the third shot is injected from the first barrel 45 to complete the part.

In yet another application, the multi-barrel injection-molding machine 80 is used to manufacture several parts using a single mold 15. In this arrangement, the mold 15 includes at least two distinct cavities, with each cavity suited to forming a single part. The first barrel 45 delivers material to the first cavity with the flow valve 130 between the mold 15 and the second barrel 45 in the closed position. Once the first part is formed, the mold 15 is held closed to allow the part to cool. During this period, material is injected from the second barrel 45 into the second cavity to form the second part. Because only one part is formed at any given time, the force generated by the pressure within the mold 15 does not exceed the clamp force produced by the clamping unit 35.

It should be noted that the manifold 100 need not be positioned as described herein. Other locations of the manifold 100 are possible. In addition, other manifolds 100 may include fewer or more valves and/or flow paths and may be arranged differently than the manifold 100 described herein. In addition, multiple components could be employed to define the manifold 100. Thus, the actual arrangement of the components and the manifold 100 is not important so long as the resulting device is capable of performing the functions described above.

Figure 8:
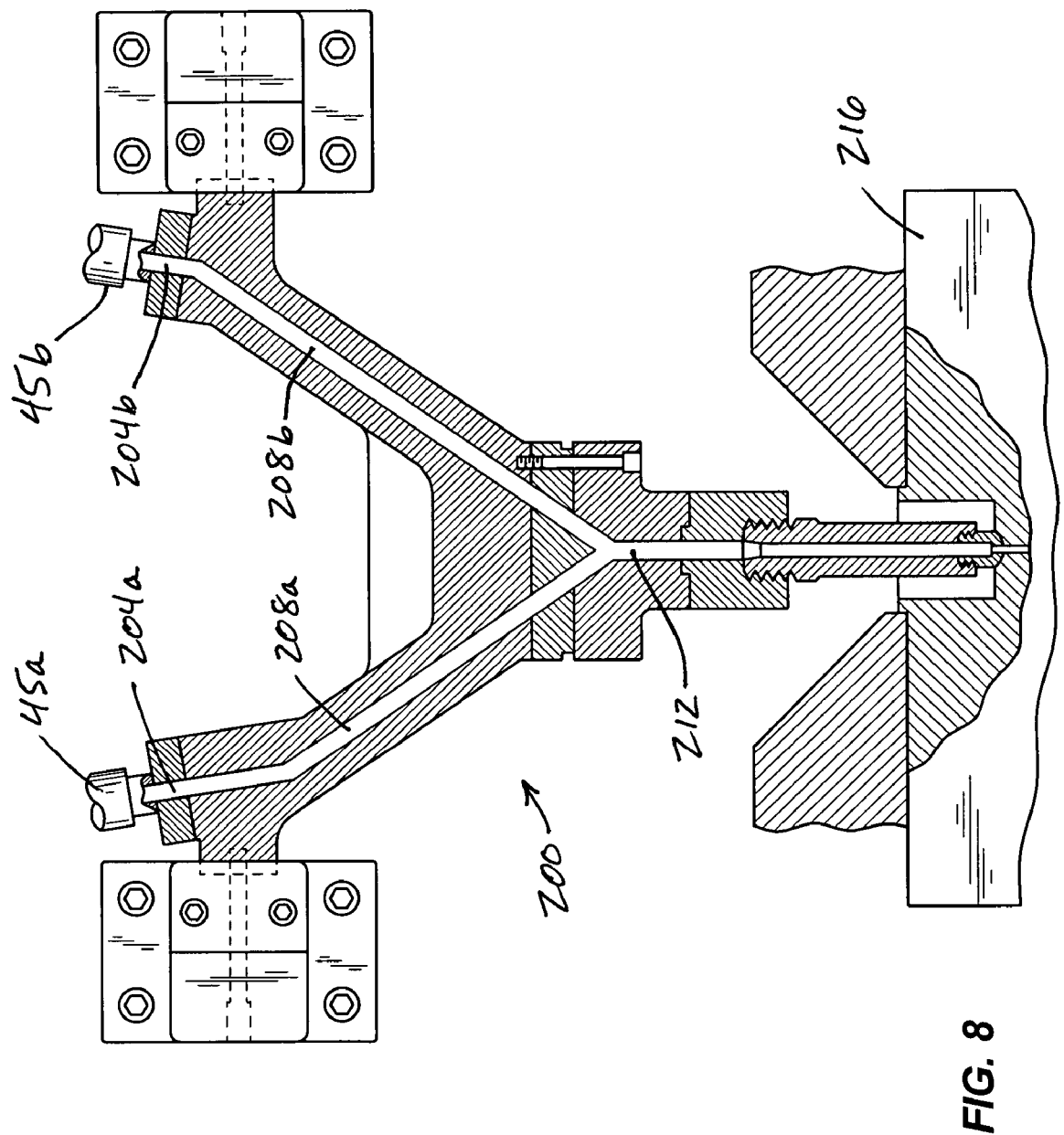
FIG. 8 shows an alternative embodiment of the invention.

FIG. 8 illustrates an alternative injection molding machine using two barrels 45a and 45b for filling a mold cavity having a volume greater than that of either barrel alone. The barrels feed into a Y-block or manifold 200 having first and second inlets 204a and 204b respectively communicating with the first and second barrels 45a and 45b. The inlets 204a and 204b communicate with respective flow paths 208a and 208b that merge into a single flow path 212 ending in an outlet. The outlet communicates with the inlet port of a mold 216 defining the mold cavity. First, the barrel 45a delivers a first shot to the mold cavity. After the first shot, the screw of the barrel 45a is reversed to stop flow from the barrel 45a and effectively shut off the first barrel 45a. Next, the second barrel 45b delivers a shot, which may or may not fill the cavity. Also, the second shot may or may not be the entire capacity of the barrel 45b. The screw of the second barrel 45b can be reversed to stop the second shot whenever the cavity is filled. If the second shot does not fill the cavity, another shot can be delivered by the first barrel 45a, which can be reloaded during the second shot. This alternation of the barrels can be continued as necessary until the cavity is filled.

Figure 9:
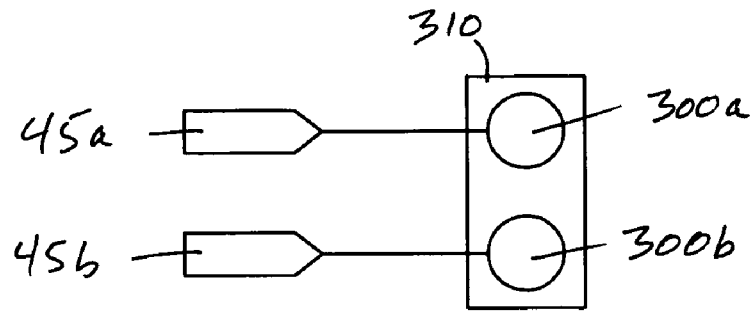
FIG. 9 is a schematic illustration of an alternative embodiment of the invention.

FIG. 9 schematically illustrates an alternative injection molding machine using two barrels 45a and 45b for sequentially filling two mold cavities 300a and 300b in a single mold 310. The barrels 45a and 45b feed into respective inlet ports of the mold cavities 300a and 300b. First, the barrel 45a delivers a shot to the mold cavity 300a. Next, the barrel 45b delivers a shot to the cavity 300b.

Figure 10:
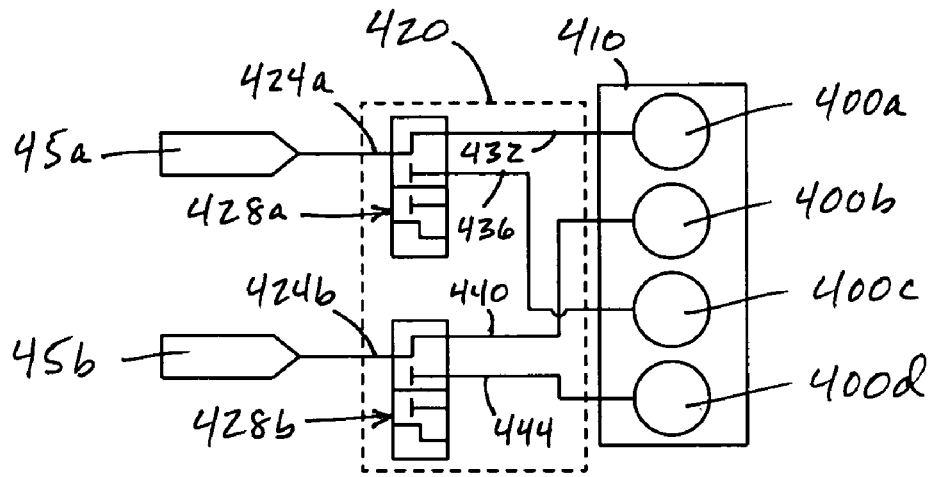
FIG. 10 a schematic illustration of an alternative embodiment of the invention.

FIG. 10 schematically illustrates an alternative injection molding machine using two barrels 45a and 45b for sequentially filling four mold cavities 400a, b, c and d in a single mold 410. The barrels 45a and 45b feed into a Y-block or manifold 420 having first and second inlets respectively communicating with the first and second barrels 45a and 45b. The inlets communicate with respective flow paths 424a and 424b having respective outlet ends communicating with respective valves 428a and 428b. On the other side of the valve 428a are two flow paths 432 and 436. The first path 432 ends in an outlet communicating with the inlet port of the first mold cavity 400a. The second path 436 ends in an outlet communicating with the inlet port of the third mold cavity 400c. The valve 428a is movable between two states. In the first state (FIG. 10), the flow path 424a communicates with the path 432 and the path 436 is blocked. In the second state (not shown), the path 424a communicates with the path 436, and the path 432 is blocked. On the other side of the valve 428b are third and fourth flow paths 440 and 444. The path 440 ends in an outlet communicating with the inlet port of the second mold cavity 400b. The path 444 ends in an outlet communicating with the inlet port of the fourth mold cavity 400d. The valve 428b is movable between two states. In the first state (FIG. 10), the flow path 424b communicates with the path 440 and the path 444 is blocked. In the second state (not shown), the path 424b communicates with the path 444, and the path 440 is blocked.

First, with the valve 428a in its first state, the barrel 45a delivers a shot to the first cavity 400a. Next, with the valve 428b in its first state, the barrel 45b delivers a shot to the second cavity 400b. The first barrel 45a is reloaded during the second shot. Next, with the valve 428a in its second state, the barrel 45a delivers a shot to the third cavity 400c. The second barrel 45b is reloaded during the third shot. Next, with the valve 428b in its second state, the barrel 45b delivers a shot to the fourth cavity 400d.

Figure 11:
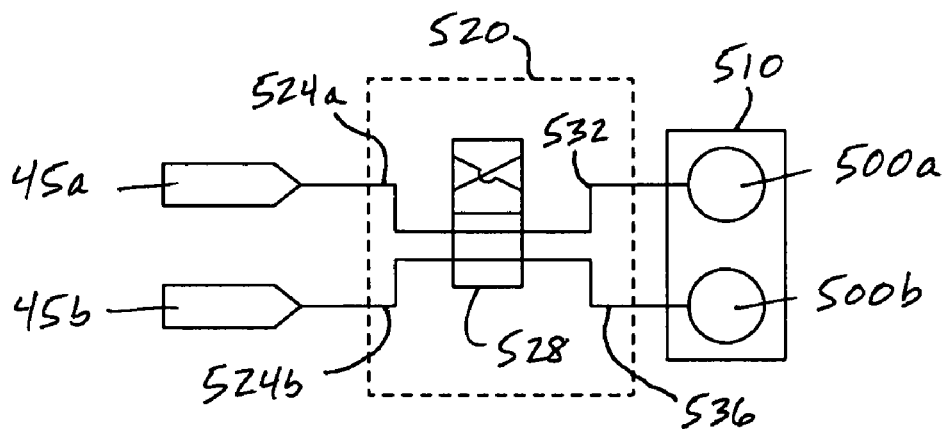
FIG. 11 a schematic illustration of an alternative embodiment of the invention.

FIG. 11 schematically illustrates an alternative injection molding machine using two barrels 45a and 45b for sequentially filling two mold cavities 500a and 500b in a single mold 510. The barrels feed into a Y-block or manifold 520 having first and second inlets respectively communicating with the first and second barrels 45a and 45b. The inlets communicate with respective flow paths 524a and 524b having respective outlet ends communicating with a valve 528. On the other side of the valve 528 are two flow paths 532 and 536. The first path 532 ends in an outlet communicating with the inlet port of the first mold cavity 500a. The second path 536 ends in an outlet communicating with the inlet port of the second mold cavity 500b. The valve is movable between two states. In the first state (FIG. 11), the flow path 524a communicates with the flow path 532 and the flow path 524b communicates with the flow path 536. In the second state (not shown), the flow path 524a communicates with the flow path 536 and the flow path 524b communicates with the flow path 532. In other words, in the first valve state, the first barrel 45a communicates with the first cavity 500a and the second barrel 45b communicates with the second cavity 500b. In the second valve state, the first barrel 45a communicates with the second cavity 500b and the second barrel 45b communicates with the first cavity 500a. This allows the barrels to have different material, and either material can be delivered to either cavity. This can be done sequentially to avoid exceeding the capacity of the clamping device.

Thus, the invention provides, among other things, a new and useful multi-barrel injection molding machine and a method of using the machine.

The invention claimed is:

1. A method of injection molding at least two parts in a single mold having at least first and second cavities, the method comprising providing a first injection molding device communicating with the first cavity without being in communication with the second cavity, providing a second injection molding device in communication with the second cavity without being in communication with the first cavity, using the first injection molding device to inject material into the first cavity, and thereafter using the second injection molding device to inject material into the second cavity.

2. A method according to claim 1 wherein the mold has first and second inlet ports respectively communicating with the first and second cavities, and wherein the first device communicates with the first inlet port and the second device communicates with the second inlet port.

3. A method according to claim 1 wherein the mold has therein a third cavity, and wherein the method comprises, after using the second injection molding device to inject material into the second cavity, using the first injection molding device to inject material into the third cavity.

4. A method according to claim 3 and further comprising using a manifold having an outlet communicating with the first cavity and an outlet communicating with the third cavity, the manifold being operable to cause the first device to communicate with either of the outlets.

5. A method according to claim 3 wherein the mold has therein a fourth cavity, and wherein the method comprises, after using the first injection molding device to inject material into the third cavity, using the second injection molding device to inject material into the fourth cavity to fill the fourth cavity.

6. A method according to claim 5 and further comprising providing a manifold having a first outlet communicating with the first cavity, a second outlet communicating with the second cavity, a third outlet communicating with the third cavity, and a fourth outlet communicating with the fourth cavity, and operating the manifold to cause the first device to communicate with either of the first and third outlets and to cause the second device to communicate with either of the second and fourth outlets.

7. A method according to claim 6 wherein the manifold includes a first valve operable to cause the first device to alternatively communicate with the first and third outlets, and a second valve operable to cause the second device to alternatively communicate with the second and fourth outlets.

8. A method according to claim 1 wherein the first device includes a first barrel with a first barrel outlet, and a first screw in the first barrel for moving material toward the first barrel outlet, and wherein the second device includes a second barrel with a second barrel outlet, and a second screw in the second barrel for moving material toward the second barrel outlet.

9. A method according to claim 8 and further comprising providing a manifold having first and second manifold inlets respectively communicating with the first and second barrel outlets, and first and second manifold outlets respectively communicating with the first and second cavities.

10. A method according to claim 1 wherein the first device fills the first cavity and the second device fills the second cavity.

11. A method of injection molding at least two parts in a single mold having at least first and second cavities, the method comprising providing a first injection molding device and a second injection molding device, using the first injection molding device to inject a first material into the first cavity, thereafter using the second injection molding device to inject a second material different from the first material into the first cavity, using the first injection molding device to inject the first material into the second cavity, and thereafter using the second injection molding device to inject the second material into the second cavity.

12. The method according to claim 11, further comprising injecting the first material into the second cavity concurrently with injecting the second material into the first cavity.

13. A method of injection molding at least two parts in a single mold having at least first and second cavities, the method comprising sequentially injecting a first material and a second material into the first cavity, and injecting the first material into the second cavity concurrently with injecting the second material into the first cavity.

14. Injection molding apparatus comprising a co-injection nozzle having first and second nozzle inlets, first and second injection molding devices having respective first and second device outlets, and a manifold communicating with the device outlets and having first and second manifold outlets for respective communication with the first and second nozzle inlets, the manifold being operable to selectively enable the first device outlet to communicate with either one of the manifold outlets, and to selectively enable the second device outlet to communicate with the other one of the manifold outlets, the manifold including a valve having a first state in which the first device outlet communicates with the first manifold outlet and the second device outlet communicates with the second manifold outlet, and a second state in which the first device outlet communicates with the second manifold outlet and the second device outlet communicates with the first manifold outlet.

15. Injection molding apparatus comprising a mold having first and second mold cavity inlets, first and second injection molding devices having respective first and second device outlets, and a manifold communicating with the device outlets and having first and second manifold outlets for communication with the first and second mold cavity inlets, respectively, the manifold being operable to selectively enable the first device outlet to communicate with either one of the manifold outlets, and to selectively enable the second device outlet to communicate with the other one of the manifold outlets, the manifold including a valve having a first state in which the first device outlet communicates with the first manifold outlet and the second device outlet communicates with the second manifold outlet, and a second state in which the first device outlet communicates with the second manifold outlet and the second device outlet communicates with the first manifold outlet.

16. Injection molding apparatus for use with a mold cavity, the apparatus comprising first and second injection molding devices having respective first and second device outlets for respective first and second materials, a co-injection nozzle for communication with the mold cavity, the nozzle having a core material inlet and a skin material inlet, and a manifold communicating with the device outlets, and communicating with the co-injection nozzle, the manifold including a first manifold outlet communicating with the core material inlet and a second manifold outlet communicating with the skin material inlet, and a valve having a first state in which the first device outlet communicates with the first manifold outlet and the second device outlet communicates with the second manifold outlet, and a second state in which the first device outlet communicates with the second manifold outlet and the second device outlet communicates with the first manifold outlet, the manifold being operable to cause only first material to be injected into the cavity, to cause only second material to be injected into the cavity, to cause first material to enter the core material inlet and second material to enter the skin material inlet, or to cause second material to enter the core material inlet and first material to enter the skin material inlet.

17. An apparatus according to claim 16 wherein the manifold also includes a valve for alternatively permitting and preventing material flow through the first manifold outlet, and a valve for alternatively permitting and preventing material flow through the second manifold outlet.

18. An apparatus according to claim 16 wherein the manifold is operable to cause the first material and the second material to be sequentially injected into the core material inlet and the skin material inlet.

* * * * *

UNITED STATES PATENT AND TRADEMARK OFFICE
CERTIFICATE OF CORRECTION

PATENT NO. : 7,648,669 B2  Page 1 of 1
APPLICATION NO. : 11/289850
DATED : January 19, 2010
INVENTOR(S) : Bemis et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1055 days.

Signed and Sealed this

Twenty-third Day of November, 2010

David J. Kappos
*Director of the United States Patent and Trademark Office*